US006889934B1

(12) United States Patent
Thomas et al.

(10) Patent No.: US 6,889,934 B1
(45) Date of Patent: May 10, 2005

(54) SYSTEMS AND METHODS FOR GUIDING MUNITIONS

(75) Inventors: Steve H. Thomas, Minneapolis, MN (US); James R. Hager, Golden Valley, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/871,252

(22) Filed: Jun. 18, 2004

(51) Int. Cl.[7] .............................. F41G 7/00; F41G 9/00; F42B 10/60; F42B 10/62
(52) U.S. Cl. ................... 244/3.19; 244/3.15; 244/3.23; 244/3.24; 89/1.11; 342/61; 342/62
(58) Field of Search .................... 244/3.1–3.3; 89/1.11; 342/61–65; 701/200, 207–224

(56) References Cited

U.S. PATENT DOCUMENTS

| | | | | |
|---|---|---|---|---|
| 3,832,711 A | * | 8/1974 | Grant et al. ............... 244/3.19 |
| 3,883,091 A | * | 5/1975 | Schaefer ..................... 244/3.13 |
| 4,256,275 A | * | 3/1981 | Flick et al. ................. 244/3.19 |
| 4,264,907 A | * | 4/1981 | Durand et al. ............. 244/3.19 |
| 4,679,748 A | * | 7/1987 | Blomqvist et al. ......... 244/3.19 |
| 4,967,981 A | * | 11/1990 | Yff ............................. 244/3.21 |
| 4,979,696 A | * | 12/1990 | Yff ............................. 244/3.14 |
| 4,997,144 A | * | 3/1991 | Wolff et al. ................ 244/3.14 |
| 5,061,930 A | * | 10/1991 | Nathanson et al. ........ 244/3.19 |
| 5,129,595 A | | 7/1992 | Thiede et al. |
| 5,131,602 A | * | 7/1992 | Linick ........................ 244/3.14 |
| 5,440,193 A | | 8/1995 | Barrett |
| 5,606,324 A | * | 2/1997 | Justice et al. ................. 342/62 |
| 5,613,650 A | * | 3/1997 | Kaifu et al. ................ 244/3.16 |
| 5,669,581 A | | 9/1997 | Ringer |
| 5,762,290 A | * | 6/1998 | Dupont ....................... 244/3.15 |
| 5,779,187 A | | 7/1998 | Dulat et al. |
| 5,917,442 A | * | 6/1999 | Manoogian ................... 342/62 |
| 6,069,584 A | | 5/2000 | Johnson |
| 6,163,021 A | * | 12/2000 | Mickelson ................... 244/3.2 |
| 6,208,936 B1 | * | 3/2001 | Minor et al. ................ 701/220 |
| 6,237,496 B1 | * | 5/2001 | Abbott ....................... 244/3.14 |
| 6,244,536 B1 | * | 6/2001 | Cloutier ..................... 244/3.19 |
| 6,307,514 B1 | * | 10/2001 | West .......................... 244/3.14 |
| 6,388,610 B1 | | 5/2002 | Przyjemski et al. |
| 6,398,155 B1 | * | 6/2002 | Hepner et al. ............. 244/3.15 |
| 6,481,666 B2 | * | 11/2002 | Frucht ....................... 244/3.15 |
| 6,520,448 B1 | * | 2/2003 | Doty et al. ................ 244/3.23 |
| 6,592,070 B1 | * | 7/2003 | Doty ......................... 244/3.23 |
| 6,672,533 B1 | * | 1/2004 | Regebro .................... 244/3.13 |
| 6,722,609 B2 | | 4/2004 | Linick |
| 6,724,341 B1 | * | 4/2004 | Pereira et al. ................ 342/62 |

* cited by examiner

*Primary Examiner*—Bernarr E. Gregory
(74) *Attorney, Agent, or Firm*—Matthew Luxton, Esq.; Armstrong Teasdale LLP

(57) ABSTRACT

A method of guiding a munition to a target transmitting one or more signals is described. The method includes configuring the munition with a radio frequency receiver, an antenna for the receiver mounted such that a main beam of the antenna pattern for the antenna is offset from a line of flight axis of the munition by an angle and configuring the munition to rotate along an axis substantially similar to the line of flight axis of the munition. The method also includes configuring the munition to process signals received at the antenna, wherein heading changes of the munition, the angle of the main beam of the antenna from the line of flight axis, and the rotation of the munition result in the received signals having amplitude variations. Directional corrections are generated for the munition to direct the munition towards the target based on amplitude variations in the received signals.

24 Claims, 7 Drawing Sheets

SYSTEMS AND METHODS FOR GUIDING MUNITIONS

BACKGROUND OF THE INVENTION

This invention relates generally to guidance of weapons systems, and more specifically, to systems and methods for guiding munitions.

Radio frequency (RF) seeker systems that are incorporated within large missiles are typically high frequency, RF guided monopulse seeker systems incorporating multiple apertures. Such seeker systems process amplitude variations in the received RF signals during the flight of the missile. The amplitude variations result since the missile line of flight typically varies to and from a line of sight to the target. A line of sight to the target is the desired course for the missile. However, the rather complex RF guided monopulse seeker systems with multiple apertures and multiple signal processing units must be calibrated and temperature compensated in order to minimize errors resulting from gain and bias differences between the multiple signal processing units.

The above described RF guided monopulse seeker systems are too large in physical size to be incorporated into smaller munitions such as mortars, although RF guidance of such munitions is desired. In addition, such systems typically are too costly to be incorporated into smaller munitions.

BRIEF SUMMARY OF THE INVENTION

In one aspect, a method of guiding a munition to a target transmitting one or more signals is provided. The method comprises configuring the munition with a radio frequency receiver, an antenna for the receiver mounted such that a main beam of the antenna pattern for the antenna is offset from a line of flight axis of the munition by an angle, and configuring the munition to rotate along an axis substantially similar to the line of flight axis of the munition. The method further comprises programming the munition to process signals received at the antenna, wherein heading changes of the munition, the angle of the main beam of the antenna from the line of flight axis, and the rotation of the munition result in the received signals having amplitude variations. Directional corrections for the munition are generated to direct the munition towards the target based on variations in the received signals.

In another aspect, a radio frequency guided munition is provided which comprises a chassis configured to rotate at an angular velocity upon launch, the rotation substantially along a line of flight axis of the munition, at least one control surface mounted on the chassis, and a radio frequency receiver mounted within the chassis. The radio frequency receiver comprises a antenna mounted such that a main beam of an antenna pattern associated with said antenna is offset from the line of flight axis of the munition by an angle and is configured to receive signals transmitted by a target. The munition further comprises a processor configured to process signals received from the radio frequency receiver. The processor is configured to generate elevation and azimuth corrections to direct the munition towards the target based on variances in amplitude of the received signals transmitted by the target. The processor is further configured to cause the at least one control surface to change a line of flight for the munition based on generated elevation and azimuth corrections.

In still another aspect, a radio frequency receiver for a guided munition is provided. The receiver comprises an antenna mounted such that a main beam of an antenna pattern associated with the antenna is offset from line of flight axis of the guided munition by an angle and configured to receive transmissions from a target. The receiver also comprises a peak detecting circuit configured to receive signals representative of RF signals received by the antenna and output an absolute value of the amplitude of the signals. The receiver further comprises an averaging circuit configured to receive an output of the peak detecting circuit, and a differencing circuit configured to receive an output of the peak detecting circuit and an output of the averaging circuit. The output of the differencing circuit is indicative of an error between a line of flight axis of the guided munition and a line of sight from the guided munition to the target.

In yet another aspect, a method of implementing radio frequency guidance for a munition is provided. The method comprises installing a radio frequency receiver within the munition, mounting an antenna for the receiver such that a main beam of the antenna pattern for the antenna is offset from a line of flight axis of the munition by an angle, and configuring the munition to rotate along an axis substantially similar to a longitudinal axis of the munition. The method also comprises programming the munition to process signals received at the antenna and configuring the munition to change a position of at least one control surface of the munition based on the processed signals.

DETAILED DESCRIPTION OF THE INVENTION

A small radio frequency (RF) receiver which requires no calibration or temperature compensation is described herein. The RF receiver is utilized for the guidance of smaller munitions, such as mortars, which cannot accommodate the physically larger and more costly RF guided monopulse seeker systems described above. The RF receiver described herein is sometimes referred to herein as an RF seeker. In addition, the described RF seeker provides a directional error correction mechanism. The RF seeker operates with a small size, wide beam antenna as described below. Directionality is provided by mounting the antenna to the munition such that the main lobe of the antenna pattern is at an angle with respect to the longitudinal axis of the munition, rotating the munition during flight, and then processing signals received from transmitting targets. Mounting the antenna at the angle as above described is sometimes referred to as mounting the antennas at a squint angle.

By mounting the antenna at an angle, and then rotating the munition, the signals received at the munition appear to be of varying strength, due to an antenna pattern associated with the antenna. Therefore, the combination of the mounting angle of the antenna and rotation of the munition result in the received signals being located at different points on the antenna pattern of the RF seeker antenna and is sometimes referred to herein as operating on an edge of the antenna pattern.

Figure 1:
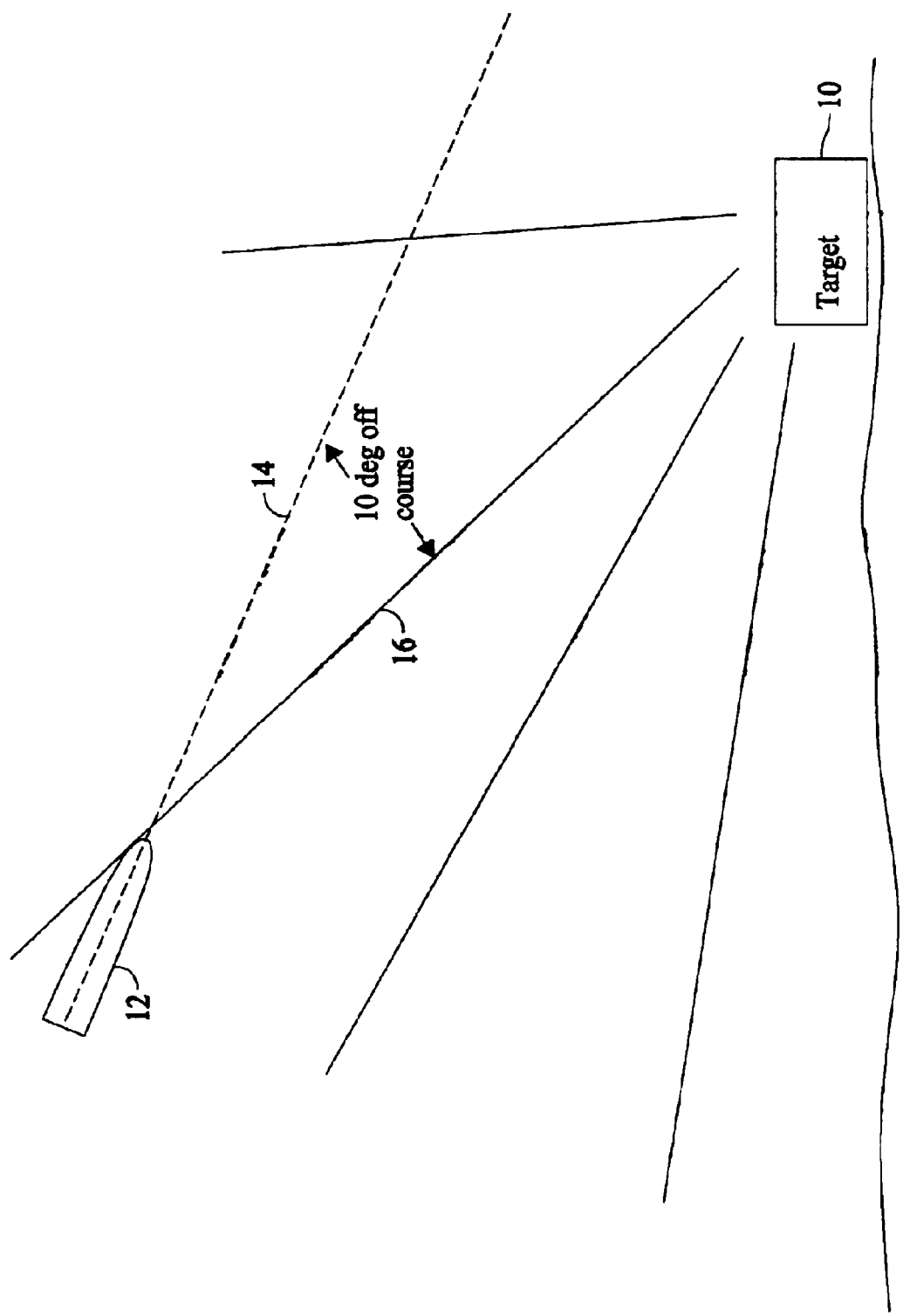
FIG. 1 illustrates a target transmitting a radio frequency and a munition with a line of flight axis that is ten degrees from a desired course.

FIG. 1 illustrates a target 10 that is transmitting radio frequency energy, and a munition 12 that has been launched towards target 10. Munition 12 is receiving the transmitted RF energy and has a line of flight 14 that is about ten degrees from a desired line of flight 16 to target 10. Desired line of flight 16 is a line of sight to target 10 from munition 12.

Figure 2:
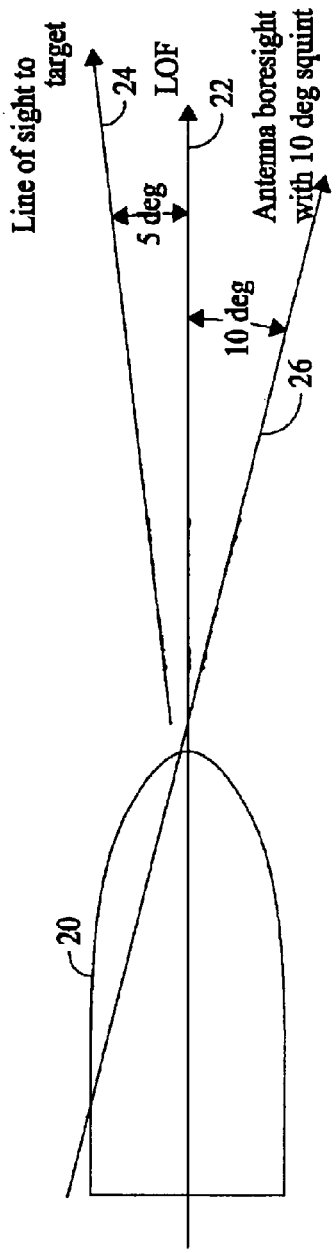
FIG. 2 illustrates an antenna mounting angle which is offset about ten degrees from a line of flight.

FIG. 2 illustrates a munition 20 with a corresponding line of flight 22. A line of sight 24 to an illuminated target (not shown) is approximately five degrees from line of flight 22, and therefore munition 20 is five degrees from a desired course to the target. Rather than boresighting the antenna (e.g. aiming the main beam of the antenna pattern) of munition 20 along line of flight 22, the antenna is mounted with a boresight angle 26 that is about ten degrees, as an example, from line of flight 22. A longitudinal axis of munition 20 is substantially aligned with line of flight 22. In addition, munition 20 is configured to rotate along an axis that is substantially similar to line of flight 22. With such a configuration, and due to the rotation of munition 20, the antenna boresight angle 26, and therefore the main beam of the antenna pattern, rotates around line of flight 22, and intersects line of sight 24 once during each rotation of munition 20.

Figure 3:
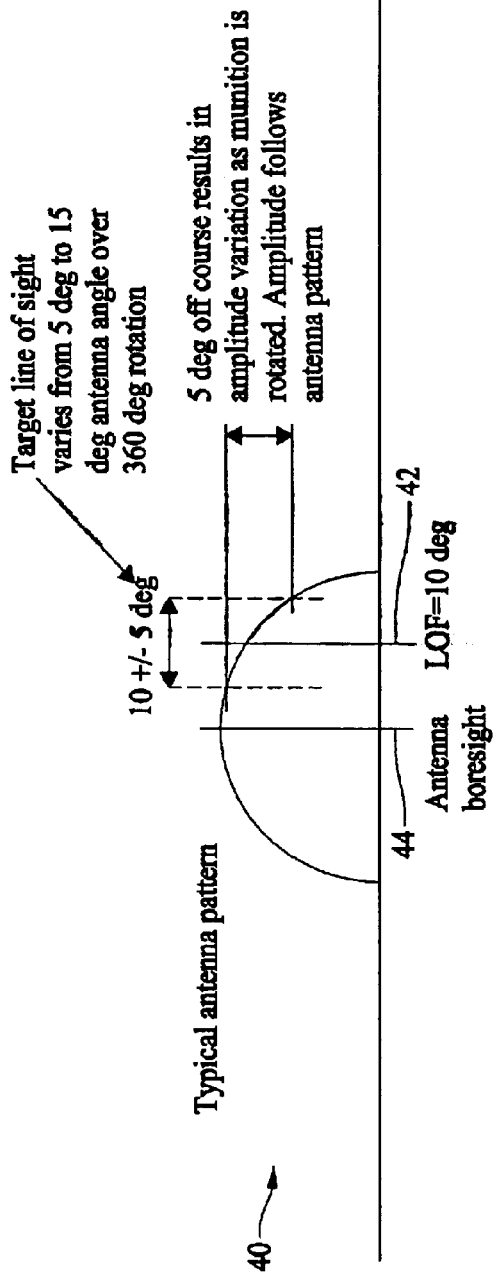
FIG. 3 is a wide beam antenna pattern showing a munition line of flight axis that is offset by about ten degrees from an antenna boresight axis.

FIG. 3 is a typical wide beam antenna pattern 40 illustrating a munition line of flight axis 42 which is located about ten degrees from antenna boresight axis 44. As described with respect to FIG. 2, a line of sight to a target is the sum of the ten degree antenna boresight angle 26 and the five degrees between the line of flight 22 and the line of sight 24 to the target, or about fifteen degrees from antenna boresight axis 44. As munition 20 begins to rotates from this starting point (also shown in FIG. 2), the target line of sight varies between five degrees and fifteen degrees from antenna boresight angle 26, which is illustrated as antenna boresight axis 44 on antenna pattern 40. In addition, a further result of munition 20 rotation is that an amplitude of the signal return received by the antenna varies in accordance with an antenna gain variation for the particular gain pattern of the antenna between five and fifteen degrees from boresight axis 44.

The scenario described with respect to FIGS. 2 and 3 is one example antenna mounting angle combined with one example difference between a line of flight and a line of sight. Many other combinations are possible. However, the above described example illustrates that an antenna mounted at an angle with respect to a target, and thus an amplitude of a signal received by the antenna, will vary with rotation of munition 20. In addition, the angle from the desired course (difference between antenna boresight and line of sight to the target) will varying about the fixed mounting angle of the antenna. As munition 20 is guided closer to the desired line of flight, the angle variance of the line of flight about the antenna mounting angle becomes less and is eventually reduced to approximately zero when there is no variation between the angle to the target and the line of flight. A change in the line of flight is determined by measuring amplitude of the received signals as munition 20 is rotated. Changes in the line of flight are provided by adjusting one or more control surfaces (i.e., a rudder, a wing, a fin, an actuator, or the like) on munition 20.

Figure 4:
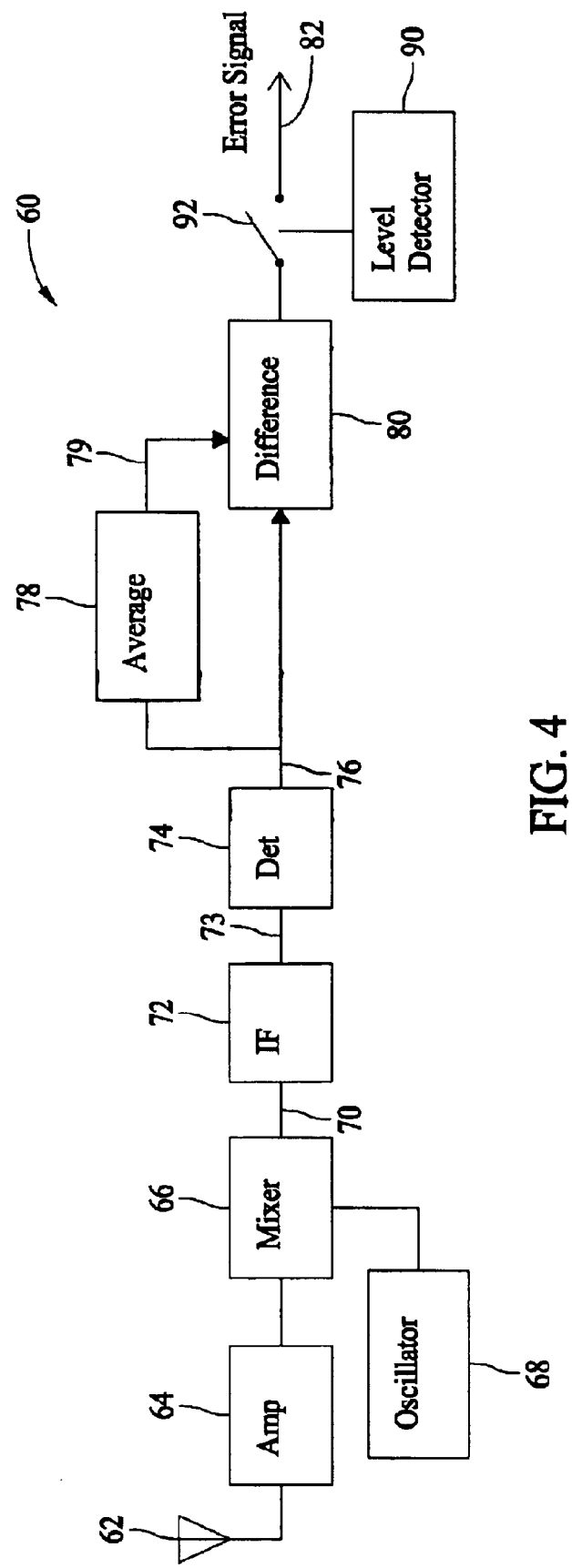
FIG. 4 is a block diagram illustrating a radio frequency receiver for a munition that is configured to process signals received from an antenna mounted at an angle with respect to a line of flight axis of the munition.

FIG. 4 illustrates one embodiment of a receiver 60 which provides an output utilized to adjust a line of flight of a munition (e.g., munition 20 (shown in FIG. 2)). In the embodiment, receiver 60 forms a portion of a munitions guidance system. In the illustrated embodiment, receiver 60 is a superheterodyne receiver incorporating a detector followed by an error function. More specifically, receiver 60 includes an antenna 62, mounted such that a main beam of its antenna pattern is at an angle from a potential line of flight as described above. Receiver 60 further includes an amplifier 64 which provides a low noise gain required to overcome mixer loss and maintain a low input noise level. A mixer 66 receives the amplified signals from amplifier 64 and mixes those amplified signals with a frequency from an oscillator 68 to provide an intermediate frequency signal 70 to intermediate frequency (IF) amplifier 72. IF amplifier 72 amplifies intermediate frequency signal 70 and provides filtering and outputs a peak detector input signal 73 having a signal level sufficient for detection by detector 74. A detector output signal 76 is provided to both an averaging circuit 78 and a differencing circuit 80. An output 79 of averaging circuit 78 is also provided to differencing circuit 80, which provides an error signal 82 indicative of the error between a line of flight and a line of sight to the target.

In one embodiment, a level detector 90 is utilized to prevent error signal from being output from receiver 60 until munition 20 is past a peak of its trajectory. Without level detector 90, munition 20 would begin to receive error signal 82 at launch, causing munition 20 to try to nose down and head directly towards target 10 at launch. In such a scenario, munition 20 would likely not EVER reach TARGET 10. In one embodiment, level detector 90 is oriented to close switch 92, allowing error signal 82 to be output by receiver 60, when muntion 20 has a nose down angle of about 30 degrees from horizontal. Level detector 90 can be configured to close switch 92 at any number of orientations of munition 20 with respect to a target. The embodiment illustrated in FIG. 4 is one example embodiment for incorporating level detector 90. Many other configurations are possible, and switch 92 can be located nearly anywhere within receiver. In another specific embodiment, level detector 90 and switch 92 are configured switch the power supplied to receiver 60 when the nose down angle approaches the correct angle (e.g., 30 degrees nose down from horizontal).

As munition 20 is rotated, assuming its line of flight is not the same as a line of sight to a target, error signal 82 is an approximate sine wave used directly to correct the course of munition 20 by causing a change in position of at least one of the flight control surfaces. Specifically, error signal 82 reduces to an average value of zero when munition 20 is on the desired course to the target. Calibration and temperature compensation are not necessary with the embodiment of receiver 60 described, as there is only one signal processing path, and bias errors are removed due to the rotation affect of the signals received at averaging circuit 78.

In one embodiment, receiver 60 is configured with a bandwidth and a center receive frequency prior to launch, thereby providing rejection of multiple emitters not matching the configuration of munition 20 (e.g., differences in frequency and/or modulation). In one embodiment, as described above, the RF seeker operates with a small size, wide beam antenna (e.g., antenna 62). Directionality for munitions are provided by mounting antenna 62 such that the main antenna beam is at an angle from a line of flight axis of munition 20. The configuration of receiver 60 provides for the processing of received signals on an edge of the antenna pattern, as described above.

Figure 5:
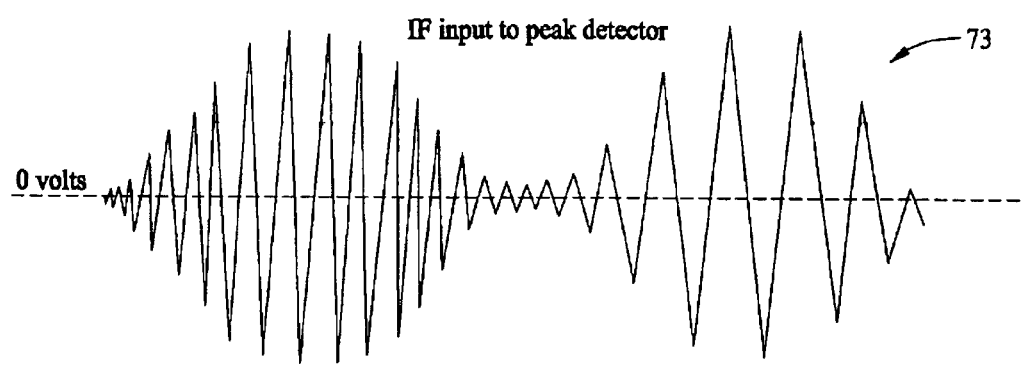
FIG. 5 is an example of an input signal to a peak detector.
Figure 6:
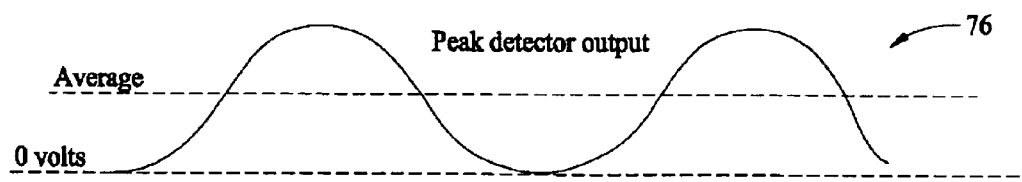
FIG. 6 is an example peak detector output for the input signal of FIG. 5.
Figure 7:
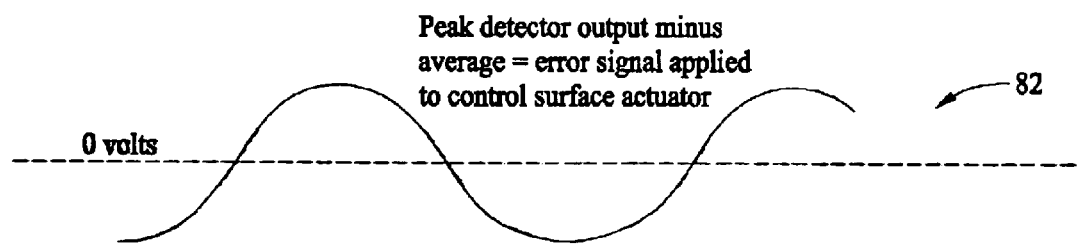
FIG. 7 is an example of an error signal calculated by subtracting an average from the peak detector output.

FIGS. 5, 6, and 7 illustrate generation of error signal 82 by receiver 60. Specifically, referring to FIG. 5, an output of IF amplifier 72, peak detector input signal 73, which is input to peak detector 74 is shown. Peak detector input signal 73 has a larger amplitude when the error between a line of flight and a line of sight of munition 20 is largest, and is smallest when the error between a line of flight and a line of sight of munition 20 is nearest to zero.

FIG. 6 is an illustration of an example detector output signal 76. Peak detector 74 outputs a positive signal (e.g., output signal 76) based on an absolute value of the amplitude of peak detector input signal 73. As such, detector output signal 76 has an average value. The average value of detector output signal 76 represents the above described example ten degree line of flight position on the antenna pattern 40. FIG. 7 illustrates a portion of error signal 82 which is generated by subtracting the average of detector output signal 76 from detector output signal 76, thereby providing a signal centered at approximately zero volts. In one embodiment, error signal 82 is directly applied to a polarity sensitive actuator (not shown) of a munition 20, which moves the one or more control surfaces controlling a trajectory of munition 20 in one direction when error signal 82 is positive, and in an opposite direction when error signal 82 is negative.

Figure 8:
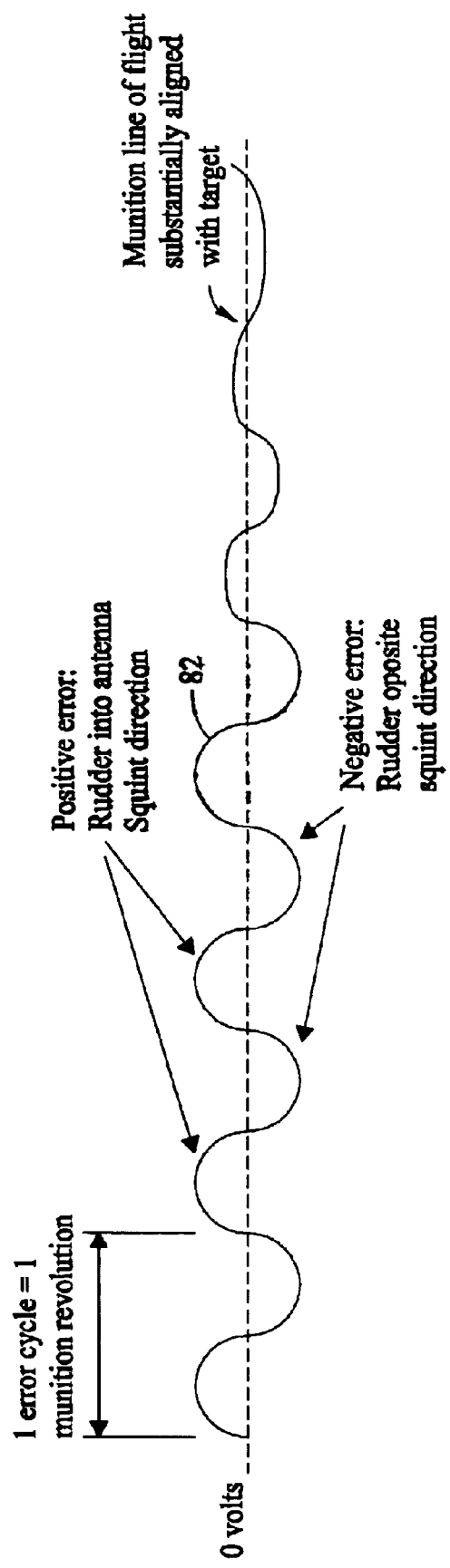
FIG. 8 illustrates a relationship between an error signal and direction correction for a munition incorporating a radio frequency receiver incorporating an antenna mounted such that its mean beam is offset from a line of flight axis of the munition by an angle.

FIG. 8 illustrates in more detail the relation between error signal 82 and directional corrections to a munition flight path, for example, by a rudder or other control surface attached to munition 20. In the described example, an axis of rotation of the rudder is parallel to the axis about which the main beam of antenna 62 (shown in FIG. 4) rotates. As illustrated by error signal 82, as the rudder guides the rotating munition towards the line of sight to the target, an amplitude of error signal 82 decreases. Once munition 20 is substantially aligned with the line of sight to the target, an amplitude of error signal 82 reduces substantially to zero.

Figure 9:
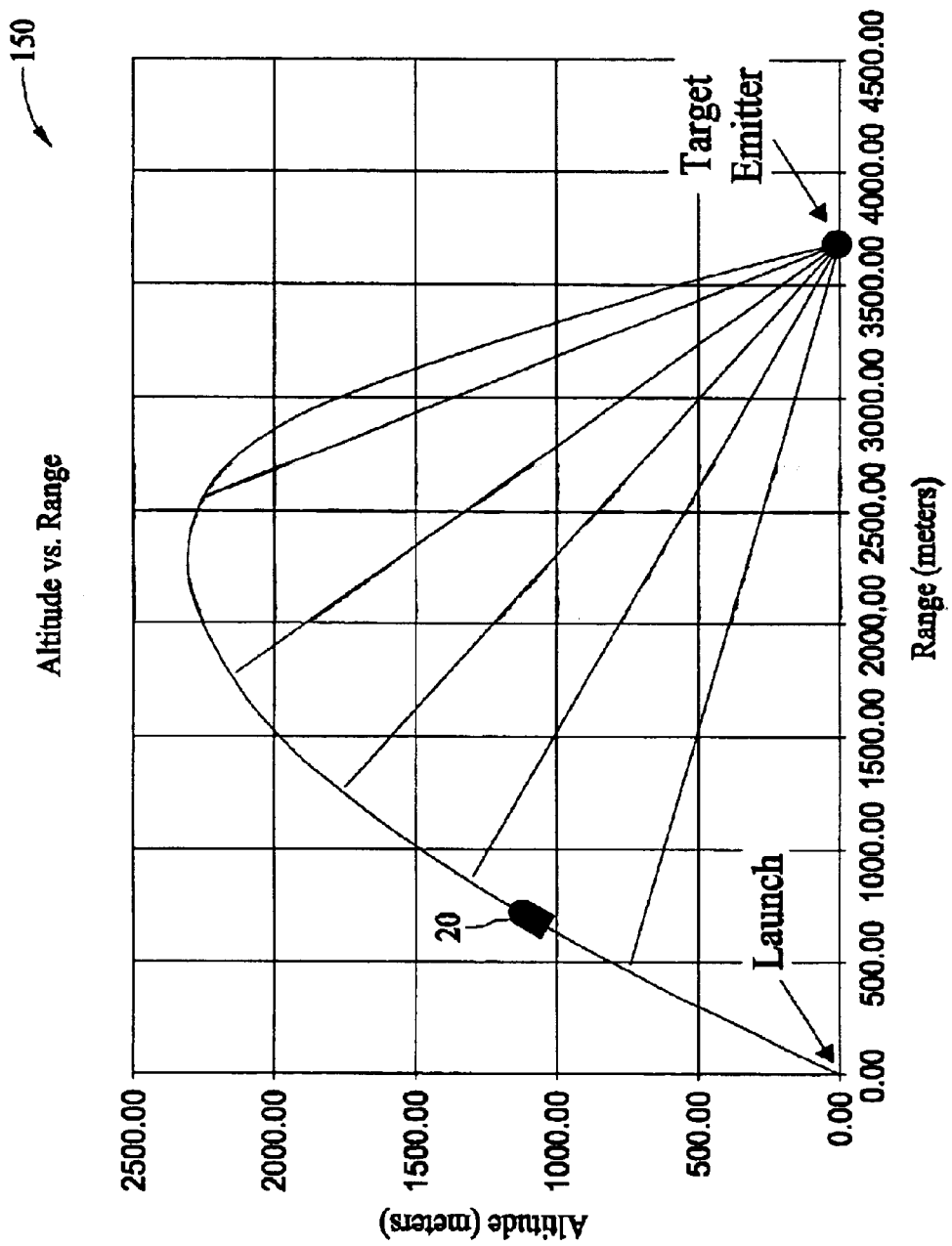
FIG. 9 illustrates a typical trajectory for a munition.

The wide spectrum of angles to a transmitting target, encountered throughout the flight of a munition, is illustrated by the trajectory example 150 of FIG. 9. A line of sight to the emitter with respect to an X-axis of munition 20 varies from approximately thirty to approximately zero degrees through the downward portion of the trajectory of munition 20. Specifically, small antenna aperture restrictions due to the size of such smaller weapons, such as mortars result in a relatively narrow range of angles over which precise directivity can be attained. As such, antenna 62, for example, is oriented to cover the narrow range of angles. As described above, munition 20 is configurable to receive signals from radio frequency receiver 60 (shown in FIG. 4) once munition 20 starts the downward portion of its trajectory, and use the received signals to adjust the trajectory of munition 20 anywhere within the range of angles.

By taking advantage of a natural spin of munition 20 or by causing a rotation of munition 20 at a specific angular velocity, antenna and system complexity is greatly reduced. As described above, a single offset antenna (e.g., an antenna mounted such that its main beam is at an angle with respect to a line of flight) is then utilized to measure the signal amplitude transmitted by the target. The measured difference in received signal amplitude for these positions is an error signal that is utilized to correct the flight control for azimuth and elevation utilizing a single antenna 62, a single signal processing channel (e.g., receiver 60) and a single control surface. The actual angular velocity (rotation rate of munition 20) is not important as long as the rate is within signal sampling capabilities of receiver 60, and the rate at which the control surfaces of munition 20 can be controlled.

The above described systems therefore significantly simplify antenna configuration and allow for RF guidance of smaller weapons, such as mortars. Since the same slopes of the antenna pattern are utilized in different angular positions, antenna gain does not have to be calibrated, since only a difference in amplitude is measured and used in the flight control.

While the invention has been described in terms of various specific embodiments, those skilled in the art will recognize that the invention can be practiced with modification within the spirit and scope of the claims.

What is claimed is:

1. A method of guiding a munition to a target transmitting one or more signals, said method comprising:

configuring the munition with a radio frequency receiver, an antenna for the receiver mounted such that a main beam of the antenna pattern for the antenna is offset from a line of flight axis of the munition by an angle;

configuring the munition to rotate along an axis substantially similar to the line of flight axis of the munition;

configuring the munition to process signals received at the antenna, wherein heading changes of the munition, the angle of the main beam of the antenna from the line of flight axis, and the rotation of the munition result in the received signals having amplitude variations; and generating directional corrections for the munition to direct the munition towards the target based on the amplitude variations in the received signals.

2. A method according to claim 1 wherein configuring the munition to process signals received comprises generating an error signal indicative of an error between a line of flight of the munition and a line of sight to the target.

3. A method according to claim 2 wherein generating an error signal comprises:

determining an average of the received signal; and determining a difference signal between the received signal and the average of the received signal.

4. A method according to claim 3 wherein generating elevation and azimuth corrections for the munition comprises utilizing the difference signal to adjust a control surface of the munition.

5. A method according to claim 1 wherein rotating the munition causes the main beam of the antenna pattern for the antenna to periodically intersect a line of flight of the munition.

6. A method according to claim 1 further comprising controlling operation of the radio frequency receiver based on an angle of the munition with respect to the target.

7. A method according to claim 1 further comprising setting a bandwidth and center frequency for the radio frequency receiver prior to launch of the munition.

8. A method according to claim 1 further comprising rejecting elevation and azimuth corrections for the munition based on signals received at the antenna that would result in a deviation in the flight of the munition from an established trajectory that is greater than a threshold.

9. A radio frequency guided munition comprising:

a chassis configured to rotate at an angular velocity upon launch, the rotation substantially along a line of flight axis of said munition;

at least one control surface mounted on said chassis;

a radio frequency receiver mounted within said chassis, said radio frequency receiver comprising an antenna, said antenna mounted such that a main beam of an antenna pattern associated with said antenna is offset from the line of flight axis of the munition by an angle, said antenna configured to receive signals transmitted by a target; and a circuit to process signals received from said radio frequency receiver, said circuit configured to generate elevation and azimuth corrections to direct said munition towards the target based on variances in amplitude of the received signals transmitted by the target, said circuit to cause said at least one control surface to change a line of night for said munition based on generated elevation and azimuth corrections.

10. A radio frequency guided munition according to claim 9 wherein one or more of heading changes of said munition, the angle of the main beam of the antenna from the line of flight axis, and the rotation of the munition result in target transmitted signals being received by said antenna at different points on an antenna pattern of said antenna.

11. A radio frequency guided munition according to claim 9 wherein rotation of said munition will result in target transmitted signals being received by said antenna at a varying amplitude.

12. A radio frequency guided munition according to claim 9 wherein said circuit is configured to generate an error signal indicative of an error between a line of flight of the munition and a line of sight to the target.

13. A radio frequency guided munition according to claim 12 wherein to generate the error signal said circuit is configured to:

determine an average of the received signal; and determine a difference between the received signal and the average of the received signal, the difference being the error signal; and apply the error signal to adjust said at least one control surface.

14. A radio frequency guided munition according to claim 11 further comprising a level detector, said level detector configured to control operation of said radio frequency receiver based on an angle of said munition with respect to the target.

15. A radio frequency guided munition according to claim 11 wherein said radio frequency receiver is configured with a bandwidth and center frequency, based on transmission characteristics of the target emitter.

16. A radio frequency guided munition according to claim 11 further comprising a level detector, said level detector configured to switch power to said radio frequency receiver during a downward portion of the trajectory of said munition.

17. A radio frequency (RF) receiver for a guided munition, said RF receiver comprising:

an antenna mounted such that a main beam of an antenna pattern associated with said antenna is offset from line of flight axis of the guided munition by an angle and configured to receive transmissions from a target;

a peak detecting circuit configured to receive signals representative of RF signals received by said antenna and output an absolute value of the amplitude of the signals;

an averaging circuit configured to receive an output of said peak detecting circuit; and a differencing circuit configured to receive an output of said peak detecting circuit and an output of said averaging circuit, an output of said differencing circuit indicative of an error between a line of flight axis of the guided munition and a line of sight from the guided munition to the target.

18. An RF receiver according to claim 17 further comprising:

an amplifier configured to receive and amplify signals from said antenna;

an oscillator;

a mixer configured to receive the amplified signals from said amplifier and mix the amplified signals with a frequency from said oscillator to provide an intermediate frequency (IF) signal; and an IF amplifier configured to amplify the IF signal from said mixer and output the amplified signal to said peak detecting circuit.

19. An RF receiver according to claim 17, said receiver operable to be configured with a bandwidth and a center frequency of a transmitter associated with a target for the guided munition.

20. An RF receiver according to claim 17 wherein said antenna is configured to output a signal having an amplitude dependent on a rotation of the guide munition.

21. An RF receiver according to claim 17 further comprising a level detector, said level detector configured to control an output of said RF receiver based on an angle of the guided munition with respect to the target.

22. A method of implementing radio frequency guidance for a munition, said method comprising:

installing a radio frequency receiver within the munition;

mounting an antenna for the receiver such that a main beam of the antenna pattern for the antenna is offset from a line of flight axis of the munition by an angle;

configuring the munition to rotate along an axis substantially similar to a longitudinal axis of the munition;

programming the munition to process signals received at the antenna; and configuring the munition to change a position of at least one control surface of the munition based on the processed signals.

23. A method according to claim 22 wherein an amplitude of the signals received at the antenna is controlled, at least in part, by at least one of the angle of the main beam of the antenna from the line of flight axis, and the rotation of the munition.

24. A method according to claim 22 wherein programming the munition to process signals received at the antenna comprises configuring the munition to process the signals received at the antenna during a downward portion of the trajectory of the munition.

* * * * *